(12) United States Patent
Arshad et al.

(10) Patent No.: US 7,832,223 B2
(45) Date of Patent: Nov. 16, 2010

(54) CONTROLLER AREA NETWORK BASED CLIMATE CONTROL SYSTEM FOR A SELF-PROPELLED WORK MACHINE AND METHOD OF OPERATION OF THE SAME

(75) Inventors: Mohammad Javaid Arshad, Plainfield, IL (US); Patrick T. Hinke, Burlington, WI (US); Alan G. Leupold, Plainfield, IL (US); Mark D. Klassen, Lockport, IL (US); Leonid Chernyavsky, Glenview, IL (US); Paul E. Wibbels, West Fargo, ND (US)

(73) Assignee: CNH America LLC, New Holland, PA (US)

( * ) Notice: Subject to any disclaimer, the term of this patent is extended or adjusted under 35 U.S.C. 154(b) by 775 days.

(21) Appl. No.: 11/651,712

(22) Filed: Jan. 10, 2007

(65) Prior Publication Data

US 2007/0158058 A1    Jul. 12, 2007

Related U.S. Application Data

(60) Provisional application No. 60/757,638, filed on Jan. 10, 2006.

(51) Int. Cl.
| | |
|---|---|
| F25D 17/00 | (2006.01) |
| F25D 29/00 | (2006.01) |
| B60H 1/32 | (2006.01) |
| B60H 1/00 | (2006.01) |
| G05D 1/00 | (2006.01) |
| G06G 7/00 | (2006.01) |

(52) U.S. Cl. .............. 62/180; 62/133; 62/161; 62/239; 62/244; 165/202; 701/1; 701/36; 701/50

(58) Field of Classification Search .................. 62/180, 62/239, 244, 133, 161; 165/202; 701/1, 701/36, 50

See application file for complete search history.

(56) References Cited

U.S. PATENT DOCUMENTS

| 4,467,706 A * | 8/1984 | Batcheller et al. ............. 454/70 |
|---|---|---|
| 5,275,012 A * | 1/1994 | Dage et al. .................... 62/208 |
| 5,993,312 A | 11/1999 | Panoushek et al. ............. 460/1 |
| 2001/0013826 A1 | 8/2001 | Ahmed et al. ................ 340/439 |
| 2003/0018415 A1* | 1/2003 | Sonobe et al. .............. 700/275 |
| 2003/0105567 A1 | 6/2003 | Koenig et al. .................. 701/36 |
| 2004/0064220 A1 | 4/2004 | Kobayashi .................... 701/1 |
| 2004/0254690 A1 | 12/2004 | Hasegawa et al. .............. 701/1 |
| 2005/0065684 A1 | 3/2005 | Larson et al. ................. 701/36 |
| 2005/0165513 A1* | 7/2005 | Obradovich ................... 701/1 |

* cited by examiner

Primary Examiner—Frantz F Jules
Assistant Examiner—Travis Ruby
(74) Attorney, Agent, or Firm—Patrick M. Sheldrake; Michael G. Harms

(57) ABSTRACT

A controller area network based climate control system for a work machine, and a method of operation of the same, which advantageously and economically integrates into and utilizes the resources and capabilities of a CAN of a work machine, including, but not limited to, shared data from other systems of the machine, particularly engine data including engine operating speed and temperature, for controlling climate control system operation, as well as for troubleshooting and diagnosing problems.

11 Claims, 5 Drawing Sheets

CONTROLLER AREA NETWORK BASED CLIMATE CONTROL SYSTEM FOR A SELF-PROPELLED WORK MACHINE AND METHOD OF OPERATION OF THE SAME

This application claims the benefit of U.S. Provisional Application No. 60/757,638, filed Jan. 10, 2006.

TECHNICAL FIELD

This invention relates generally to a climate control system for the interior of an operator platform or cabin of a self-propelled work machine such as a tractor, agricultural harvesting machine, or the like, and more particularly, to a controller area network based climate control system therefor, and a method of operation of the same.

BACKGROUND ART

U.S. Provisional Application No. 60/757,638 filed Jan. 10, 2006 is incorporated herein in its entirety by reference.

Environmental conditions, such as, but not limited to, temperature, humidity and/or air pressure, within an enclosed operator platform or cabin of a self-propelled work machine are typically controlled or regulated using a climate control system, also commonly referred to as a heating, ventilating and air-conditioning (HVAC) system. The climate control or HVAC system of a work machine typically includes several operator operable controls located within the cabin including, but not limited to, a mode selector, a temperature selector, and a fan speed selector. The mode selector will typically allow selecting a heat mode, an air conditioning mode, a window defrost defog mode, an air recirculation mode, and a fresh air mode. Additionally, some systems may be operable in an automatic temperature control (ATC) mode wherein the system controls the cabin air temperature to or within a range of an operator selectable value. Reference in this regard, Panoushek et al., U.S. Pat. No. 5,993,312, which illustrates a representative HVAC system for a work machine including this latter feature. Still further, some systems may be operable in a mode which automatically controls the fan speed and other elements of the system to maintain the cabin air pressure at a level above that of outside air, to limit infiltration into the cabin of outside air, dust and other contaminants from the outside environment. This feature has particular utility in work machines used in off-road applications such as construction, mining and agricultural applications, and, more particularly, such as agricultural tractors and harvesting machines, which are sometimes operated in very dusty environments, for instance, wherein the dust is so dense as to significantly limit visibility. A cabin pressure sensor may be provided for use in regulating cabin air pressure.

Operation in such intense dust can cause problems, including for instance, the partial or full clogging of the air intake filter or filters for the cabin, as well as of radiators and heat exchangers, including the air conditioning condenser, which is typically cooled using external air. As a consequence, in the instance of the air-conditioning system, the system may be required to operate for longer periods, and/or more frequently, to achieve or maintain a selected climate setting for the operator cabin. Such dust problems may be sufficiently severe so as to make it impossible for the air-conditioning system to achieve the climate setting. Such conditions, if allowed to exist, can result in increased power usage, system and component degradation and shut-down or failure, downtime for cleaning and/or repair, and operator and/or machine owner dissatisfaction.

Other conditions that can lead to or result in system, operation and component degradation and failure include, but are not limited to, operation of high electrical current using items such as the cabin air fan when the engine is not operating or is operating at less than an adequate level, drive belt slippage and failure, air-conditioning system refrigerant and oil leakage and internal blockages, coolant leakage in the lines and heat exchanger of the heating system, fan motor failure, sensor failure, cabin seal failure, and control failure.

Still further, the operation of the climate control system, and, in particular, the compressor of the air-conditioning component thereof driven by the engine of the work machine, can have power requirements which can be significant for a smaller engine, and/or an engine under heavy load, such as when the engine is being started, the work machine is accelerating, going uphill, and/or the engine is powering components such as harvesting and crop processing equipment, load bearing fluid lift cylinders and the like, such that if the air-conditioning compressor is operated, or is allowed to initiate operation, when the engine is under heavy load, the performance of the air-conditioning system, engine, and/or other components powered by the engine, and/or the engine itself, may be degraded.

It is well known to provide devices in connection with the air-conditioning system operable for sensing a condition or conditions representative of engine load and/or operating conditions, such as the engine intake vacuum and temperature, and devices for automatically controlling the engagement of the air-conditioning compressor clutch and/or the compressor, for avoiding or minimizing overloading the engine and/or degrading operation of the air-conditioning system and other systems of a vehicle. It is also well known to provide sensors, such as thermal sensors and the like, in association with various of the components of the climate control system, and operable for sensing problem conditions and outputting a signal and/or shutting down the system or component when a problem is indicated, for instance, when a component of the system such as the compressor or the condenser is clogged or obstructed, beginning to overheat, or the evaporator is freezing. Such sensors are typically connected to an air-conditioning electronic control unit (ECU), which may be operable for storing information representative of a problem condition in a memory for retrieval for use in diagnosing the problem. The ability to rapidly diagnose problems with work machines is a particularly sought after capability, as downtime for such machines can be costly.

Presently, the known climate control or HVAC systems in work machines used for off-road applications are stand-alone units having dedicated ECUs. These controllers operate in isolation and do not communicate or interface effectively with other controllers in the vehicle. This isolation has been found to restrict the ability of the HVAC system to optimally use available resources and hence ends up making the HVAC system a higher cost system.

More recently, it has been observed that work machines commonly utilize controller area networks (CANs) connecting multiple system controllers and operable for sharing both raw and processed data and information, in real-time, relating to a variety of machine systems and components, including information relating to the engine, via the engine controller, to function in a coordinated and integrated fashion. It is also observed that some CANs have a controller including software capable of automatically troubleshooting and diagnosing problems with a system or component on the CAN. It has also been found that, often, a variety of controllers on work machines have under-utilized processing capacity.

Accordingly, what is sought is a climate control system, and a method of operation of the same, which advantageously and economically integrates into and utilizes the resources and capabilities of a CAN of a work machine, including, but not limited to, shared data from other systems of the machine, particularly engine control data from an engine controller, for controlling climate control system operation, as well as for troubleshooting and diagnosing problems.

SUMMARY OF THE INVENTION

What is disclosed is a controller area network based climate control system for a work machine, and a method of operation of the same, which advantageously and economically integrates into and utilizes the resources and capabilities of a CAN of a work machine, including, but not limited to, shared data from other systems of the machine, particularly engine data including engine operating speed and temperature, for controlling climate control system operation, as well as for troubleshooting and diagnosing problems.

According to a preferred aspect of the invention, the climate control or HVAC control system is implemented through the use of a CAN bus topology to communicate with others of the vehicle components. In this approach, one or more functions of the HVAC system are distributed to other controllers of the CAN to carry out various tasks. In this way, the CAN networked devices share raw and processed information in real-time to function in a coordinated and integrated fashion. This is preferably implemented using a bidirectional messaging architecture.

According to another preferred aspect of the invention, the climate control system includes an electronic programmed processor based controller, also referred to as the Automatic Temperature Controller (ATC), which is programmed for automatically controlling the temperature of the air within the cabin interior to within a range of a temperature selected using an input device. The ATC is connected to a CAN of the work machine and is operable for sharing data and information with other controllers and devices on the network, including the engine controller or ECU. Operator input devices can include, for instance, one or more switches, potentiometers, and/or other device connected directly to an input/output port or ports of the ATC, or to another device or controller of the network. Component inputs, such as condenser temperature, evaporator temperature, refrigerant pressure, and the like can be received directly by the ATC through input ports thereof, or by other controllers of the network and shared. This can be determined on an application by application basis and can be configured so as to economize wiring requirements.

Information such as system status, mode, temperature, and the like is displayed by an instrument cluster unit (ICU) connected to the network, on a display located in the cabin. The ICU and display can also be used for displaying information relating to other systems such as the engine and/or operating or functional systems of the machine, e.g. harvesting systems of a combine, power takeoff system of a tractor, etc., and can be optionally configured to provide an input capability, for instance, for inputting climate control system commands, e.g., temperature, fan speed, mode (A/C, heat, defog) using a touch screen type display device in lieu of using discrete devices such as switches, potentiometers, and the like. The engine controller is operable for sharing engine speed information and also engine temperature on the network. The ATC controller, or another controller on the network, will preferably include a memory, such as a resetable flash type, for temporarily storing information relating to fault conditions or flagged events. The network can include a connector for connection of a diagnostic service tool thereto, to enable quickly troubleshooting and diagnosing problems.

According to another preferred aspect of the invention, in operation, the ATC controller will monitor the engine speed information shared on the network by the engine controller. The ATC controller will be programmed to prevent initiation of operation of high electrical current drain components, e.g., the cabin air blower or fan, if the engine speed is below a threshold level. This will increase the power available for engine cranking and other tasks.

DETAILED DESCRIPTION OF THE INVENTION

Figure 1:
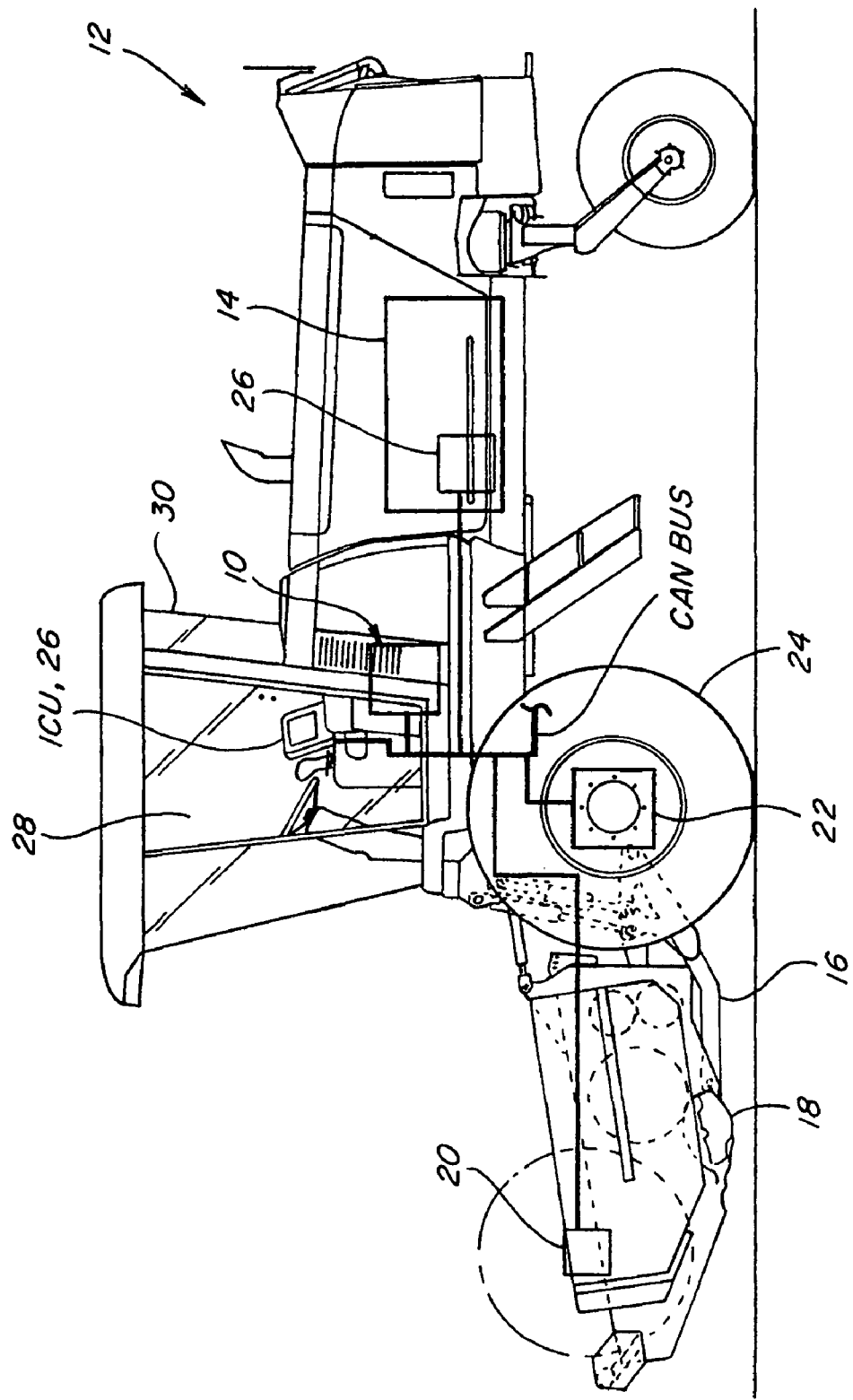
FIG. 1 is a side view of an agricultural windrower including a CAN based climate control system according to the present invention.

Turning now to the drawings wherein aspects of a preferred embodiment of a controller area network (CAN) based climate control system 10 of the invention is shown, in FIG. 1, system 10 is shown incorporated into an agricultural work machine, which is a self-propelled windrower 12. Windrower 12 is contemplated to be representative of a wide variety of work machines with which CAN based climate control systems of the present invention can be utilized, which can include, but are not limited to, other harvesting machines, such as combines and cotton pickers, tractors, earth movers, mining machines, off-road trucks, and the like. Windrower 12 includes an engine 14 operable for propelling it through fields from which crops will be cut, while powering a variety of systems thereof, including climate control system 10, and apparatus of a crop cutting header 16, including a cutter mechanism 18 extending across a lower forward end thereof, and crop gathering and processing apparatus including a reel, various conveyors, and processing rollers, operation of which are coordinated and controlled by an electronic microprocessor based controller 20 in the well known manner. The propulsion and steering of windrower 12 is controlled by an electronic drive controller 22 which is also a micro-processor based controller and operates fluid motors in driving connection to drive wheels, as represented by wheel 24. Engine 14 is controlled by an electronic engine control unit (ECU) in the well known manner. A micro-processor based climate control system controller or automatic temperature controller (ATC) of system 10, the ECU, and optionally controller 20 are connected together by a communications network or bus of the CAN, over which bus data and information are shared. Other systems of a work machine can also be connected to the CAN bus, and can include, but are not limited to, a display controller which is preferably an instrument cluster unit (ICU) connected to a display device 26 located in an interior space 28 of an operator cabin 30 of windrower 12, and other electronic controllers.

Figure 2:
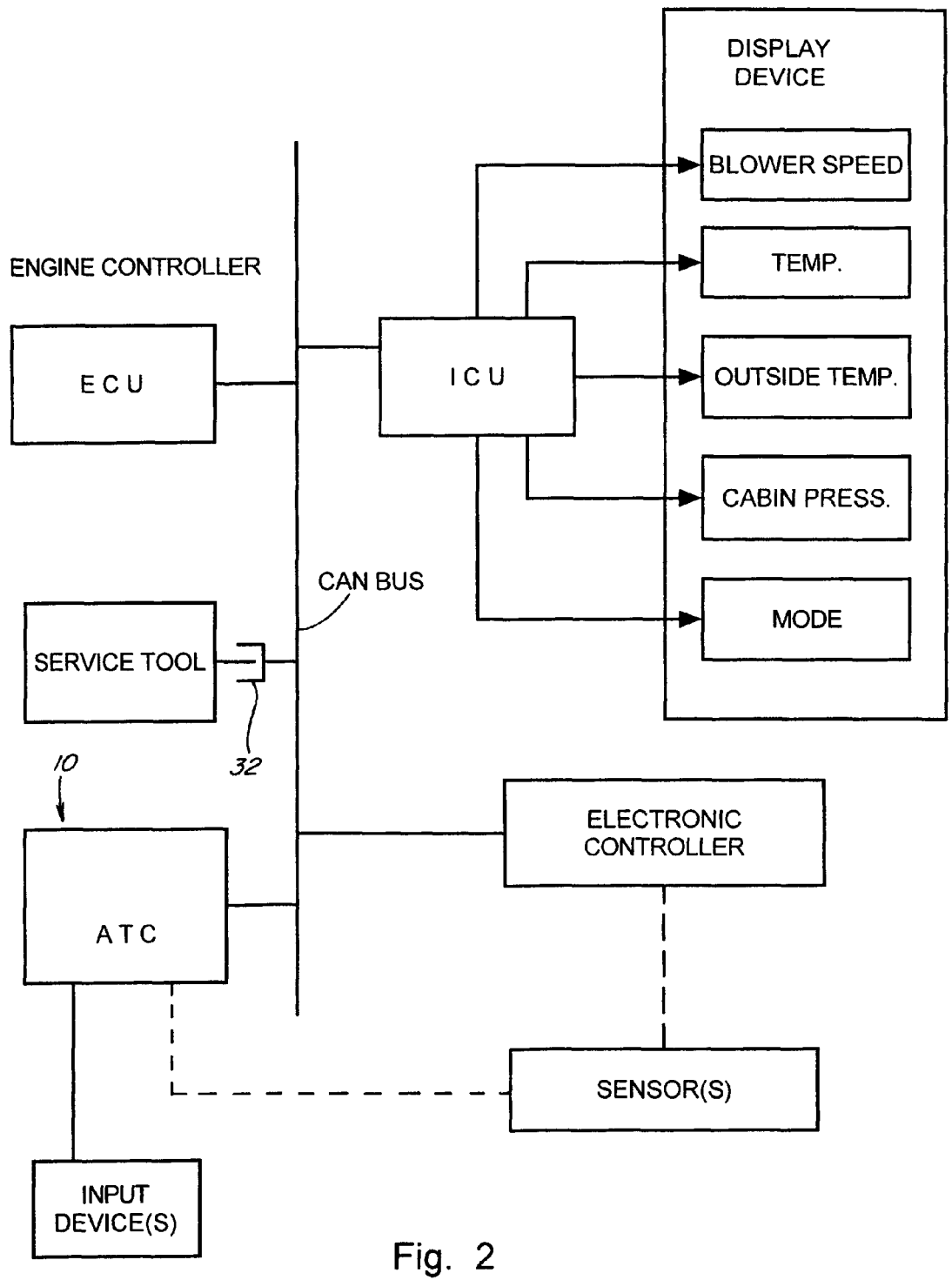
FIG. 2 is a diagrammatic representation of the CAN of the invention.

Referring also to FIG. 2, the CAN bus is shown connected to the ATC of climate control system 10, to the ECU, to the ICU, and to a representative electronic controller, which is representative of controllers of other systems, such as controllers 20 and 22, which can be connected to the CAN bus. Additionally, a service tool is shown removably connected to the CAN bus via a suitable interface, which can be for instance, a conventional RS 232 plug interface 32. Climate control system 10 is illustrated configured for operator commands to be inputted to the ATC via suitable input devices connected directly to the ATC, which can include, but are not limited to, conventional rotary or linear potentiometers, switches, and the like, typically located in cabin 30. Alternatively, system 10 could be configured such that operator inputs will be received via an interactive display device, such as a touchscreen (not shown), in connection with the CAN bus via the ICU.

The ATC is programmed to output current and/or set system conditions and operating mode information over the CAN bus to the ICU, which, in turn, is programmed to process and display the information on a suitable display device, such as device 26 located within operator cabin 30. Display device 26 can be, for instance, an LCD or CRT device, and can be configured for displaying such useful climate control system information as cabin blower or fan speed, cabin interior temperature, outside temperature, cabin pressure, and system operating mode, as well as additional information relating to other systems, such as engine speed and temperature, and information from other controllers such as controller 20 for elements of the crop gathering and processing apparatus and/or drive controller 22. Fault condition information can also be displayed, such as a high temperature condition representative of clogging of a condenser of the system (discussed below). Sensors utilized by the ATC for the operation of the climate control system can be connected directly to the ATC, or to others of the electronic controllers, as denoted by dotted lines in FIG. 2.

Figure 3:
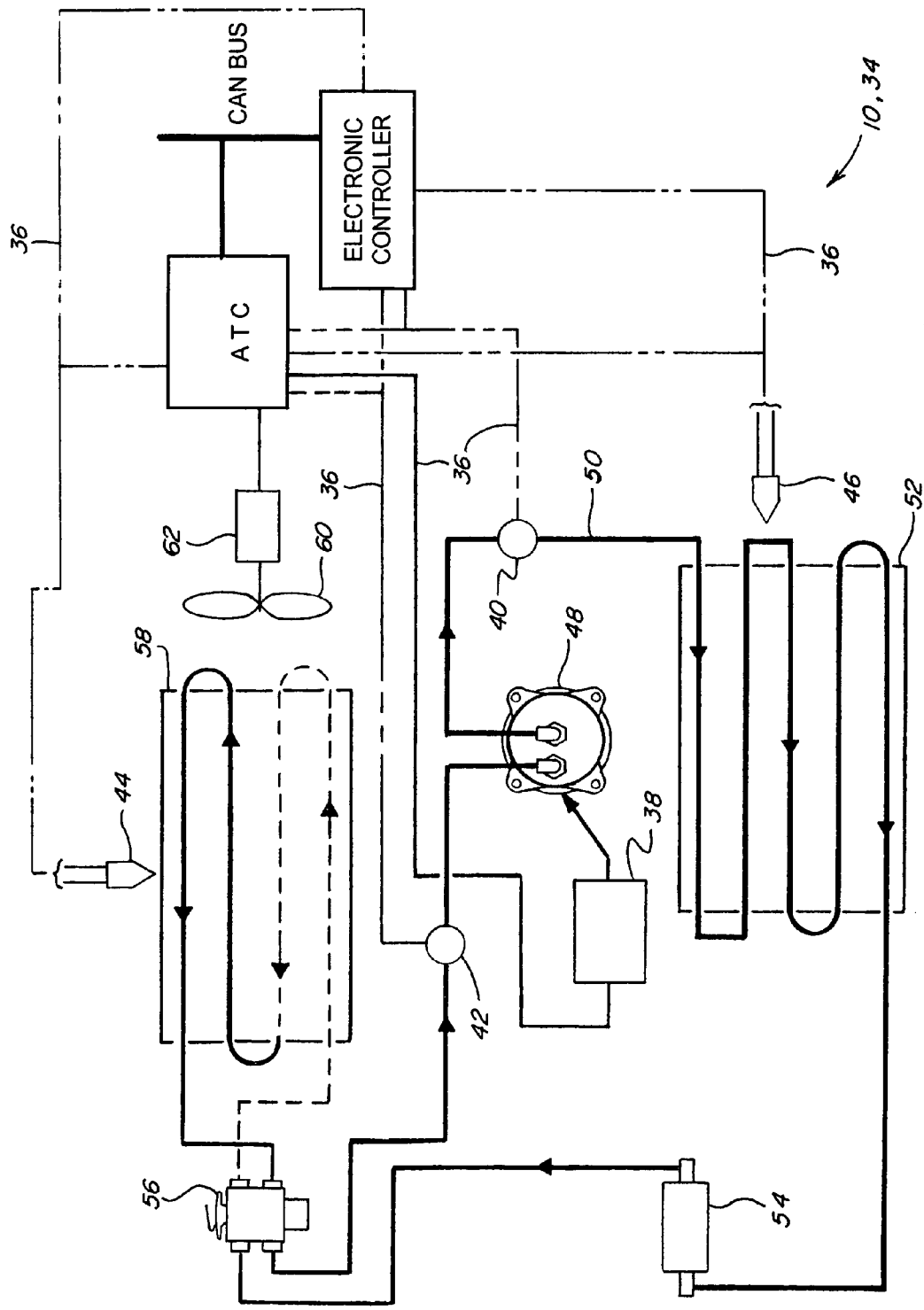
FIG. 3 is a simplified schematic representation of an air-conditioning system of the climate control system of FIG. 1.

Referring also to FIG. 3, elements of the air-conditioning system 34 of climate control system 10, are shown. The ATC is shown connected to the CAN bus, as is another representative electronic controller, in the above-described manner. The ATC is shown also connected to several components of air-conditioning system 34 by suitable conductive paths 36, which can be, for instance, wires of a wiring harness of the work machine. Such components include, but are not limited to, a compressor clutch 38, a high pressure valve or sensor 40, and a low pressure valve or sensor 42. Other components to be connected to a controller include temperature sensors 44 and 46 which are illustrated by dotted lines as being connected alternatively to the ATC or another electronic controller, to illustrate the flexibility afforded by the present system.

Compressor clutch 38 is controllable by the ATC to connect a refrigerant compressor 48 of the air-conditioning system with a drive, such as an auxiliary belt drive driven by the engine of the windrower, for compressing refrigerant of the air-conditioning system in the well known manner. The refrigerant will be compressed to a designated high pressure and will flow, as denoted by the arrows, through refrigerant lines 50 which connect to a heat exchanger or condenser 52 of a high pressure side of system 34. Condenser 52 will typically be located in a rack with other heat exchangers, such as the engine radiator, located in this application near the rear end of engine 14 in FIG. 1. Compressor 48 may be located near this end of the engine also.

Temperature sensor 46 will be a suitable device such as a thermistor and will be positioned for monitoring a temperature of condenser 52. A high temperature reading from sensor 46 will typically indicate a fault condition, that is, inadequate dissipation of heat therefrom, such as can result from a clogging or blocking of air passages through the condenser with dust. Sensor 46 may be connected by a suitable conductive path 36 directly to the ATC, or, because of its location at the end of the machine, it may be more economical or convenient to connect it to a closer electronic controller on the CAN bus other than the ATC. In either instance, the receiving controller can process the signals, and share information representative of the temperatures over the CAN bus. For instance, information indicating a high temperature condition can be displayed on device 26 to inform an operator that the condenser may need cleaning. The information can also be stored for retrieval with a service tool when connected to the bus.

High pressure sensor 40 is located in high-pressure side line 50 and is operable for detecting under pressure conditions, and possibly over pressure conditions also, in the high pressure side of the system, and outputting signals representative thereof to the ATC. Again, like sensor 46, sensor 40 can be connected directly to the ATC, or to another electronic controller on the CAN bus. The ATC can be programmed such that if sensor 40 indicates a pressure problem, the ATC can determine that a fault condition exists and place that information on the bus. And, the ATC, or another of the controllers, can be programmed to diagnose a problem in connection with the sensor, or any of the other sensors connected thereto, such as an open connection, a short, or the like.

From condenser 52, the pressurized refrigerant will flow through lines 50 of the high pressure side to a receiver dryer 54, and from there, through an expansion valve 56. The refrigerant will exit expansion valve 56 at a lower pressure, and flow at the lower pressure through a low pressure side of the system to a second heat exchanger or evaporator 58, through which cabin air is directed by a blower fan 60 for cooling the interior space of the cabin in the well known manner.

Sensor 44, which also can be a thermistor or other suitable device, is positioned for sensing a temperature condition in relation to evaporator 58, particularly, temperatures indicative of an ice build up or freezing on the outer surfaces thereof which could impede air flow therethrough. Sensor 44, like sensor 46, can be connected by a suitable conductive path 36 directly to the ATC, or it may be more economical or convenient to connect it to another electronic controller on the CAN bus other than the ATC. In either instance, the receiving controller can process the signals, and share information representative of the temperatures over the CAN bus. Again, the ATC, or other of the controllers, can be programmed to diagnose a problem in connection with this sensor, or any of the other sensors connected thereto, such as an open connection, a short, or the like.

From evaporator 58, the lower pressure refrigerant will pass through expansion valve 56 en route to compressor 48, completing a closed loop.

Figure 4:
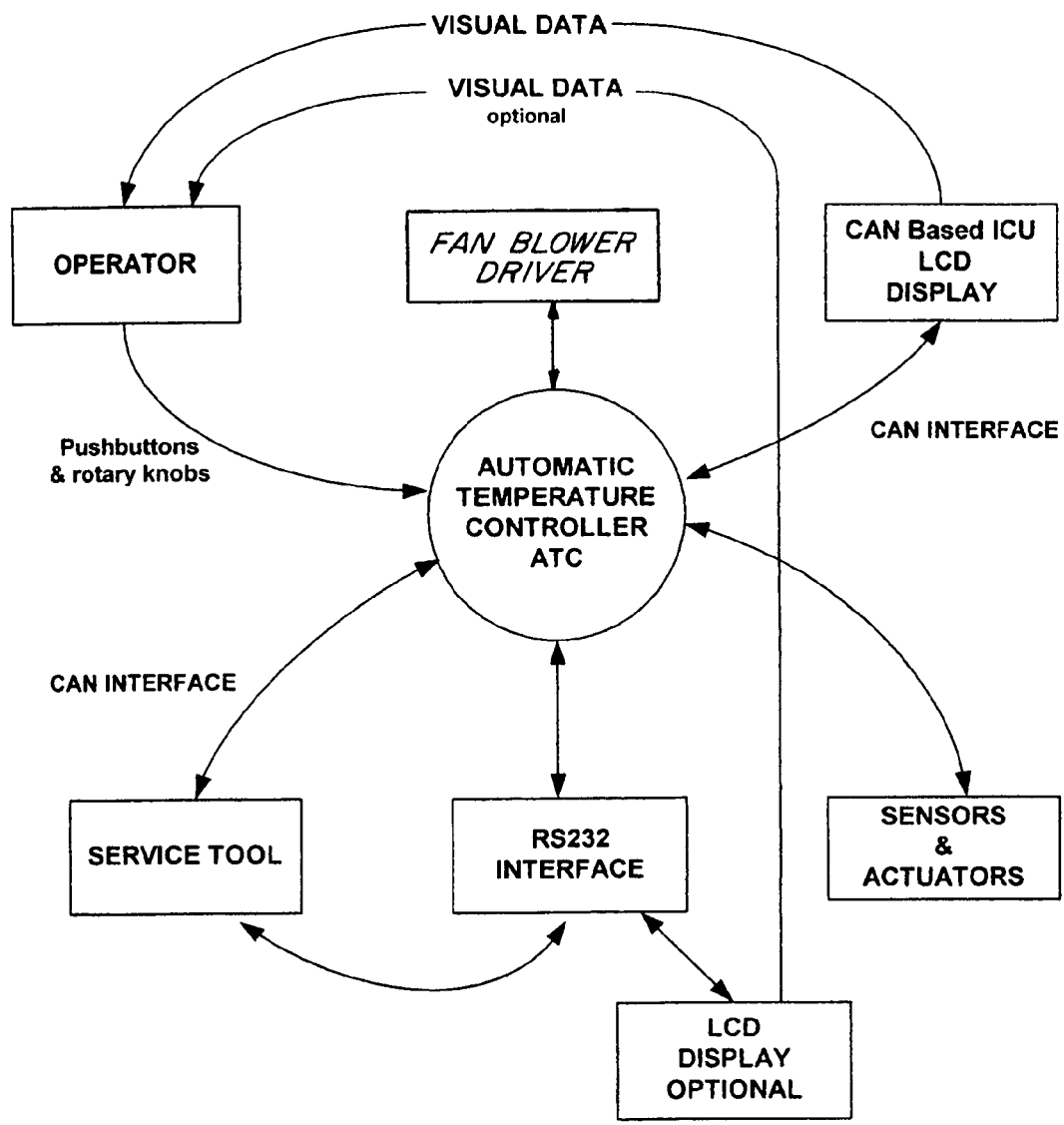
FIG. 4 is a diagrammatic representation of operation of the CAN based climate control system of the invention.

Referring also to FIG. 4, the ATC will also be connected to other sensors, which can include, but are not limited to, a cabin air temperature sensor, an outside air temperature sensor, a cabin air pressure sensor, and/or a light sensor positioned for determining presence of direct sunlight, a fan blower driver 62 (FIG. 3), and one or more actuators including a mode door actuator controllably operable for directing air flows to different regions of the operator cab interior space. Alternatively, as another advantage of the present CAB based system, these devices can be connected to other controllers on the CAB bus. Using information outputted by these and the other above discussed sensors, whether connected directly to the ATC, or shared over the CAB bus, the ATC will be equipped so as to be automatically operable for controlling the temperature of the interior space of the operator cab to or within a range of a set temperature as selected by an operator using conventional input devices such as pushbuttons and rotary knobs, in a selected operating mode, e.g.

heat, A/C, defog. The operator will be capable of viewing visual data on the display device driven by the ICU, in real-time, including the current operating mode, blower speed, cabin temperature, outside temperature, and cabin pressure, as well as new operator settings for such data. Additionally, the ATC, or any of the controllers, can be programmed to diagnose a problem in connection with these sensors or actuators, such as an open connection, a short, or other malfunction and store or share information regarding the condition over the CAN bus. And, by connecting a service tool to the CAN interface via the RS 232 plug 32, such stored information relating to, for instance, current or past system conditions and fault conditions can be retrieved, for problem troubleshooting, diagnosing and repair of any of the systems connected to controllers on the CAB bus.

Figure 5:
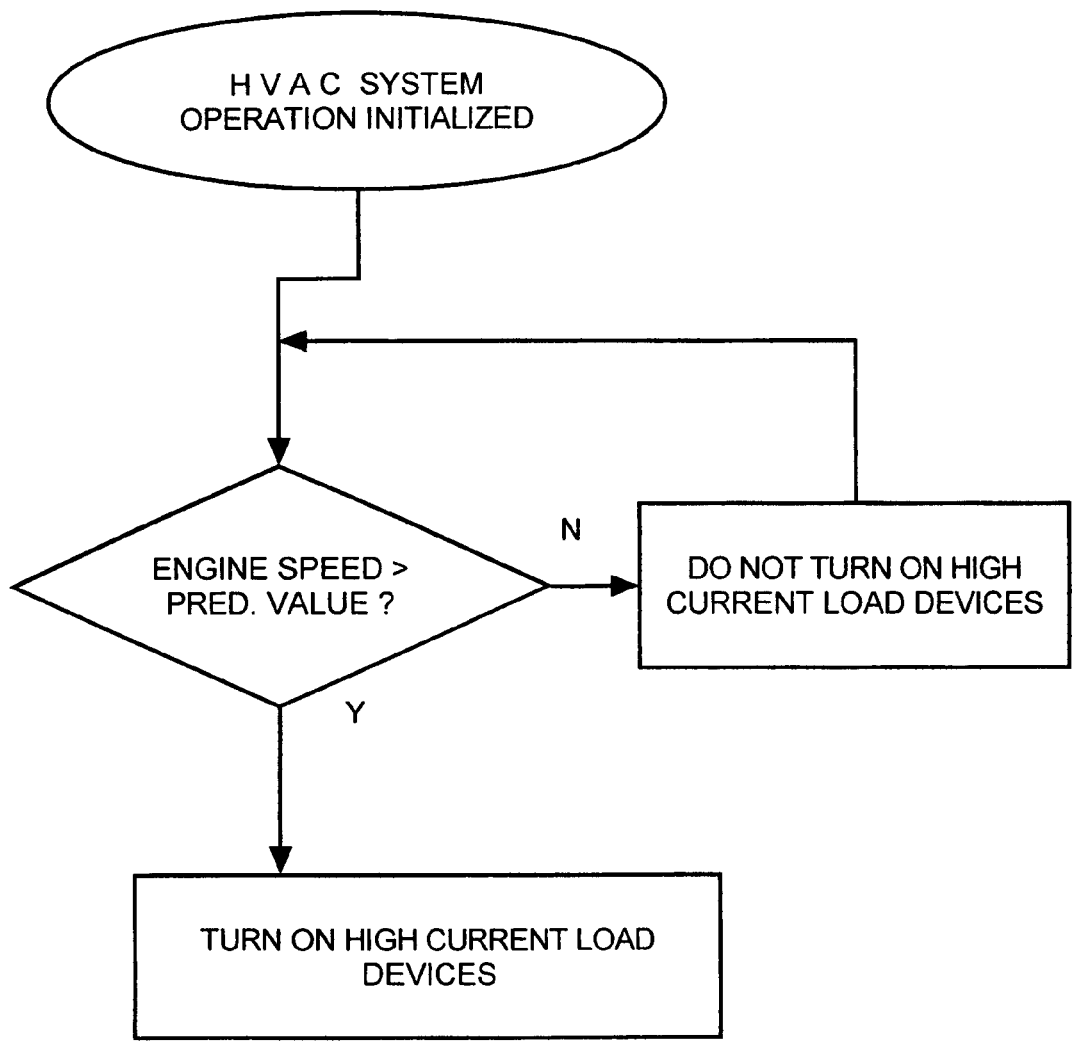
FIG. 5 is a high-level flow diagram of steps of an operating method of the invention.

Referring also to FIG. 5, as another operational advantage of providing shared data over the CAB bus, the ATC can be programmed so as not to turn on high current load devices, for instance, the fan blower driver, or to restrict the operation thereof to lower speed settings, under certain conditions, such as prior to starting of the engine, or when the engine is operating at a speed which is less than a predetermined value, so as to preserve electrical and/or charging system power for other purposes such as cranking the engine for starting. As another desirable feature, the ATC can be programmed such that functions such as conversion from Celsius to Fahrenheit operation can be accomplished by the toggling of a switch connected to any controller on the CAN bus.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A self-propelled work machine, comprising:
   an engine;
   an operator cabin including an interior space containing controls operable by an operator located within the interior space for controlling functions of the work machine;
   a climate control system comprising a plurality of components controllably operable for regulating a climate condition within the interior space, including at least one device controllably operable responsive to a control signal inputted thereto for controlling delivery of a fluid medium to a heat exchanger in connection with the interior of the cabin, a fan blower driver controllably operable responsive to a control signal inputted thereto for operating a fan blower for controlling a flow of air from the heat exchanger, to the interior of the cabin, and at least one sensor operable for sensing an operating condition of the system and outputting information representative thereof;
   a controller area network comprising a plurality of processor based controllers connected together by a communications network and operable for sharing information thereover, including an engine controller connected in operative control of the engine and automatically operable responsive to engine input commands for operating the engine and for outputting information representative of an operating condition of the engine over the network, and a climate control system controller connected to at least one input device controllable by an operator for inputting at least one climate control system command to the climate control system controller, the climate control system controller being connected to at least one of the components of the climate control system and being automatically operable responsive to the climate control system command to controllably operate the at least one component in a predetermined manner when predetermined information representative of an operating condition of the engine is present; and
   wherein the climate control system controller is configured for changing an operating state of the climate control system such that at least upon starting of the engine the blower of the climate control system is not operated when data from the engine controller shared on the network indicates that the engine is not operating above a predetermined threshold operating speed such that electrical and charging system power is preserved.

2. The work machine of claim 1, wherein the controller area network further comprises a display controller connected to the network and to a display device located in the interior of the operator cabin, the display controller being programmed to display information representative of an operating state of the climate control system and other information on the display device.

3. The work machine of claim 2, wherein the other information comprises information representative of an operating speed of the engine.

4. The work machine of claim 2, wherein the other information comprises information representative of a pressure condition within the cabin.

5. The work machine of claim 1, wherein the at least one sensor operable for sensing an operating condition of the system and outputting information representative thereof detects a condenser temperature or an evaporator temperature and is connected to a controller of the network programmed for automatically determining if the information is representative of presence of a fault condition wherein detected information of a temperature of the condenser above a predetermined value or below a predetermined value of the evaporator indicated a fault condition corresponding to the blockage of air passages within the evaporator or condenser.

6. The work machine of claim 5, wherein the controller area network further comprises a display controller connected to the network and to a display device located in the interior of the operator cabin, the display controller being programmed for displaying information representative of the fault condition when present.

7. The work machine of claim 1, wherein the work machine comprises an agricultural harvesting machine.

8. A self-propelled work machine, comprising:
   an engine;
   an operator cabin including an interior space containing controls operable by an operator located within the interior space for controlling functions of the work machine;
   a controller area network including a plurality of processor based controllers connected together by a communications network for sharing data and information, including an engine controller in control of an engine of the work machine, an automatic temperature controller in control of functions of a climate control system for an operator cabin of the work machine, and at least one additional controller;
   the climate control system comprising a plurality of components controllably operable for regulating a climate condition within the interior space, including at least sensor operable for sensing an operating condition of the system and outputting information representative thereof; and wherein the controller area network is configured to allow the at least one sensor to be connected to any of the controllers for receiving the outputted information therefrom and sharing the information on the communications network, the at least one sensor operable for sensing an operating condition of the system and outputting information representative thereof detects a condenser temperature or an evaporator temperature and is connected to a controller of the network programmed for automatically determining if the information is representative of presence of a fault condition wherein detected information of a temperature of the condenser above a predetermined value or a temperature below a predetermined value of the evaporator indicate a fault condition, the controller area network further comprising a display controller and to a display device located in the interior of the operator cabin, the display controller being programmed to visually display a generally real-time detection of the fault condition of the climate control system indicative of an obstruction in a passage within the climate control system and other information on the display device.

9. The work machine of claim 8, wherein the other information comprises information representative of an operating state of the engine.

10. The work machine of claim 8, wherein automatic temperature controller is automatically operable to prevent the supply of electrical power required for operation of at least the blower of the climate control system when information shared by the engine controller indicates that the engine is below a predetermined threshold speed.

11. A method of operation of a climate control system of self-propelled work machine, comprising steps of:

providing a controller area network including a plurality of processor based controllers connected together by a communications network for sharing data and information, including an engine controller in control of an engine of the work machine, an automatic temperature controller in control of functions of a climate control system for an operator cabin of the work machine, and at least one additional controller, the automatic temperature controller being programmed for automatically regulating a climate condition within an operator cabin of the machine based on inputs from sensors; and wherein the automatic temperature controller will prevent the drawing of current load needed for operation by a fan or blower of the climate control system at least upon starting of the engine when data from the engine controller shared on the network indicates that the engine is not operating above a predetermined threshold operating speed such that electrical charging system power is preserved.

* * * * *